United States Patent [19]

Kamens et al.

[11] Patent Number: 4,636,528
[45] Date of Patent: Jan. 13, 1987

[54] FOAMING OF UNSATURATED POLYESTER RESIN AT ELEVATED TEMPERATURES

[75] Inventors: Ernest R. Kamens, Tonawanda; John P. Cassoni, Grand Island, both of N.Y.

[73] Assignee: Pennwalt Corporation, Philadelphia, Pa.

[21] Appl. No.: 865,877

[22] Filed: May 21, 1986

Related U.S. Application Data

[63] Continuation-in-part of Ser. No. 780,475, Sep. 26, 1985.

[51] Int. Cl.$^4$ ................................................ C08J 9/10
[52] U.S. Cl. .......................................... 521/95; 521/96; 521/99; 521/128; 521/138
[58] Field of Search ................ 521/138, 95, 96, 99, 521/128

[56] References Cited

U.S. PATENT DOCUMENTS

| | | | |
|---|---|---|---|
| 4,322,502 | 3/1982 | Stott et al. | 521/138 |
| 4,393,148 | 7/1983 | Kamens | 521/96 |
| 4,397,965 | 8/1983 | Stott | 521/138 |
| 4,435,525 | 3/1983 | Kamens | 521/92 |

*Primary Examiner*—Morton Foelak

[57] ABSTRACT

Low density foams are prepared from an admixture which comprises an unsaturated polyester resin, a free radical initiator which initiator is activated at temperatures from about 100° to about 400° F., and a compound selected from a t-alkylhydrazinium salt or a carbonylhydrazine. The low density foams have uniform cell structure without cracks or voids and the process is efficient.

12 Claims, No Drawings

FOAMING OF UNSATURATED POLYESTER RESIN AT ELEVATED TEMPERATURES

This is a continuation-in-part of co-pending application Ser. No. 780,475, filed on Sept. 26, 1985.

BACKGROUND OF THE INVENTION

This invention is related to the foaming and crosslinking of unsaturated polyester resins at elevated temperatures using as a gas generating system a t-alkyl hydrazinium salt or a carbonyl hydrazine in combination with a free radical source.

The foaming and crosslinking (or curing) of unsaturated polyester resins are well known in the prior art. U.S. Pat. No. 4,393,148 discloses the foaming and curing of an unsaturated polyester resin at ambient temperatures using a peroxide curing agent, an iron or copper metal salt promoter, and a t-alkyl hydrazinium salt as a blowing agent. U.S. Pat. No. 4,435,525 discloses the foaming and curing of an unsaturated polyester resin at ambient temperatures using a peroxide curing agent, an iron or copper metal salt promoter, and a carbonyl hydrazine as a blowing agent. Neither of these references discloses the present invention. Published European patent application no. 0048050 discloses the foaming and curing of an unsaturated polyester resin using a peroxide curing agent, an organometallic salt promoter, and a t-alkyl hydrazine blowing agent.

SUMMARY OF THE INVENTION

The present invention is directed to a foamable and crosslinkable composition consisting essentially of an admixture of an unsaturated polyester resin, a free radical initiator which initiator is activated at temperatures in the range of from about 100° to about 400° F., and a compound selected from a t-alkylhydrazinium salt or a carbonylhydrazine. Optionally, a suitable surfactant may also be included in this admixture to help produce a more stable foam and a finer, more uniform structure.

DETAILED DESCRIPTION OF THE INVENTION

It has now been found that polyester resins can be simultaneously expanded and cured at elevated temperatures when they are crosslinked with an organic peroxide and/or azo initiator, preferably a dialkyl peroxide, plus either a t-alkyl hydrazinium salt or a carbonyl hydrazine. In addition to making lower density foams possible at elevated temperatures, the process of this invention enables rigid foams to be prepared from highly filled polyester resin formulations.

The composition of this invention is suitable for making many new and useful foamed products using various pressure molding techniques, such as compression, transfer, or wet molding operations. It is generally preferred to additionally incorporate an inhibitor to improve shelf-life for chemically thickened formulations such as bulk Molding Compound (BMC), Sheet Molding Compound (SMC), Thick Molding Compound (TMC), etc. Rigid foamed structures thus foamed from these formulations will be relatively inexpensive, will have good stiffness to weight ratios, will be generally resistant to heat and chemicals, and will exhibit good stability and minimal moisture pickup.

POLYMERIZABLE MEDIUM

The polymerizable media of the present invention are unsaturated polyester resins that can be cured by peroxides and/or azo initators at elevated temperatures; the unsaturated polyester resins usually include an unsaturated polyester and at least one polymerizable monomer.

The unsaturated polyesters are, for instance, obtained by esterifying at least one ethylenically unsaturated di- or polycarboxylic acid, anhydride, or acid halide, such as maleic acid, fumaric acid, glutaconic acid, itaconic acid, mesaconic acid, citraconic acid, allylmalonic acid, allylsuccinic acid, tetrahydrophalic acid, and others with saturated or unsaturated di- or polyols, such as ethylene glycol, diethylene glycol, triethylene glycol, 1,2- and 1,3-propanediols, 1,2-, 1,3-, and 1,4-butanediols, 2,2-dimethyl-1,3-propanediol, 2-hydroxy-methyl-2-hydroxymethyl-2-methyl-1,3-propanediol, 2-buten-1,4-diol, 2-butyn-1,4-diol, 2,2,4-trimethyl-1,3-pentanediol, glycerol, pentaerythritol, mannitol, and others. Mixtures of such polyacides and/or mixtures of such polyalcohols may also be used. The unsaturated di- or polycarboxylic acids may be partially replaced, by saturated polycarboxylic acids, such as adipic acid, succinic acid, sebacid acid, and others and/or by aromatic polycarboxylic acids, such as phthalic acid, trimellitic acid, pyromellitic acid, isophthalic acid and terephthalic acid. The acids used may be substituted by groups such as halogen. Examples of such suitable halogenated acids are, for instance, tetrachlorophthalic acid, 5,6-di-carboxyl-1,2,3,4,7,7,-hexachlorobicyclo(2.2.1)-2-heptene (chlorendic acid) and others.

The other component of the unsaturated polyester resin composition, the polymerizable monomer or monomers, can be preferably ethylenically unsaturated monomers, such as styrene, chlorostyrene, vinyltoluene, divinylbenzene, alphamethylstyrene, diallyl maleate, diallyl phthalate, dibutyl fumarate, acrylonitrile, triallyl phosphate, triallyl cyanurate, methyl acrylate, methyl methacrylate, n-butyl methacrylate, ethyl acrylate and others, or mixtures thereof, which are copolymerizable with said polyesters.

A preferred resin composition contains as the polyester component the esterficiation product of 1,2-propylene glycol (a polyalcohol), maleic anhydride (an anhydride of an unsaturated polycarboxylic acid) and phthalic anhydride (an anhydride of an aromatic dicarboxylic acid) as well as the monomer component, sytrene.

Other types of unsaturated resins can be cured using the compositions of this invention as curing catalysts. These resins, call unsaturated vinyl ester resins, consist of a vinyl ester resin component and one or more polymerizable monomer components. The vinyl ester resin component can be made by reacting a chloroepoxide such as epichlorohydrin with appropriate amounts of a glycol such as Bisphenol A [2,2-di(4-hydroxyphenyl)-propane], in the presence of a base such as sodium hydroxide, to yield a condensation product having terminal epoxy groups derived from epichlorohydrin. Subsequent reaction of the condensation product with polymerizable unsaturated carboxylic acids such as acrylic acid and methacrylic acid, in the presence or absence of acidic or basic catalysts, results in formation of a vinyl ester terminated resin component. Normally styrene is added as the polymerizable monomer component to complete the preparation of the unsaturated vinyl ester resin.

A more detailed description of vinyl ester resins may be found in "Unsaturated Polyester Technology", Gordon and Breach Science Publishers, New York, 1976, page 315 and in "Developments in Reinforced Plastics-1" edited by G. Pritchard, published by Applied Science Publishers, Ltd., England, 1980.

Temperatures of about 100° to 400° F. and pure peroxide levels of about 0.05% to 5% or more by weight of curable resin compositions are normally employed for curing of the unsaturated resins.

The unsaturated polyesters described above can be filled with various materials such as glass fibers, carbon blacks, silicas, metal silicates, clays, metal carbonates. Other known additives such as antioxidants, heat and light stabilizers, sensitizers, dyes, pigments, accelerators, metal oxides, blowing agents, etc. can be added.

To simplify discussion in the remainder of this text the term polyester resin will be used to describe both (i) unsaturated polyester resins and at least one polymerizable monomer and (ii) polyether resins with terminal unsaturation and at least one polymerizable monomer.

Many of the physical properties of the resultant foams will depend on the nature of the polymerizable medium in a manner well understood by those skilled in the art. Also, the number and spacing of crosslinkable functions in the resins will affect the degree of rigidity or flexibility of the cured foamed product as is well known to those skilled in the art. A wide variety of inert liquid diluents may be added to any of the above described polymerization media to give appropriate viscosity, physical properties and/or cost.

A wide variety or inhibiting agents or mixtures thereof are usually added to the above described polymerization media to give appropriate shelf-like, physical properties, and reactivity including gel and/or cure time.

Typical inhibitors used in unsaturated polyester resin solutions include hydroquinone, p-benzoquinone, mono-t-butyl-hydroquinone, 2,5-diphenyl-p-benzoquinone, t-butyl-catechol, toluhydroquinone, toluquinone, hydroquinone monomethyl ether, and others.

t-Alkylhydrozenium Salts and Carbonylhydrazines

The hydrazine derived compounds which form a part of the novel composition of this invention are t-alkyl hydrazinium salts having the following general structure

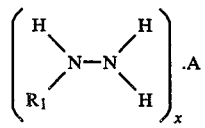

where x is an integer of 1,2,3 or 4 and A is an inorganic or organic acid, when x is 1, A is a monoprotic acid; when x is 2, A is a diprotic acid; when x is 3, A is a triprotic acid, and when x is 4, A is a terprotic acid; and $R_1$ is a tertiary alkyl radical having from about 4 to about 8 carbons.

Compounds which are also useful in this invention are carbonylhydrazines having the following general structure

where
X is selected from $R_1O-$, $R_2$,

and $H_2NNH-$; $R_1$ is selected from an alkyl of 1 to 20 carbons, cycloalkyl of 5 to 12 carbons, aralkyl of 7 to 18 carbons, aryl of 6 to 18 carbons, alkenyl of 2 to 20 carbons, alkynyl of 2 to 20 carbons, or a 5 or 6 membered heterocyclic containing a nitrogen, sulfur, or oxygen atom in the ring; $R_2$ is independently selected from $R_1$ or hydrogen; $R_3$ is either a covalent bond or a diradical selected from alkylene of 1 to 16 carbons, cycloalkylene of 5 to 16 carbons, arylene of 6 to 18 carbons, aralkylene, of 7 to 18 carbons or alkynlene of 2 to 16 carbons; each of $R_1$, $R_2$, and $R_3$ can be branched or unbranched and optionally substituted with lower alkoxy, nitro, halogen, cyano, carboxy, hydroxy, lower acyloxy, aroyloxy, sulfo, lower alkoxycarbonyl, lower alkoxycarbonyloxy, N-substituted or unsubstituted carbamoyl and carbamoyloxy, lower thioalkoxy, lower thioacyloxy, lower dithioacyloxy, lower thioalkoxycarbonyl, lower dithioalkoxycarbonyl, lower thioalkoxycarbonyloxy, lower acyl, aroyl, and lower alkylsulfonato where lower alkyl includes 1 to 6 carbons; and $R_3$ can contain connective groups in the diradical backbone selected from the group consisting of

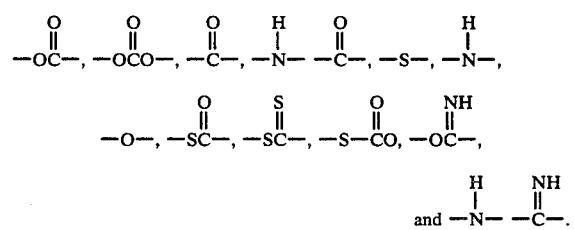

Examples of t-alkylhydrazinium salts include the following: di-t-butylhydrazinium sulfate, t-butylhydrazinium bisulfate, t-butylhydrazinium chloride, mono-t-butylhydrazinium phosphate, t-butylhydrazinium benzoate, t-butylhydrazinium acetate, di-t-butylhydrazinium succinate, t-butylhydrazinium di-(2-ethylhexyl)phosphate, mono-t-butylhydrazinium oxalate, di-t-butylhydrazinium oxalate, t-butylhydrazinium neodecanoate, di-t-butylhydrazinium azelate, t-butylhydraziniun pivalate, t-butylhydrazinium p-toluenesulfonate, t-butylhydrazinium methanesulfonate, t-butylhyrazinium sulfonate, tetra-t-butylhydrazinium 1,2,4,5,benzenetetracarboxylate, di-t-butylhydrazinium terephthalate, mono t-butylhydrazinium dipicolinate, di-t-butylhydrazinium carbonate, t-butylhydrazinium sodium sulfate, t-butylhydrazinium malate, t-butylhydrazinium tributyl sulfate and t-amylhydrazinium chloride.

Examples of carbonylhydrazine blowing agents of this invention include the following:
(1) Acid hydrazides such as formic, acetic, propionic hexanoic, oleic, lauric, stearic benzoic, toluic, furoic, eicosanoic, phenylacetic, cinnamic, mandelic, dihydrocinnamic, acetylsalicylic, anthranilic, nitrobenzoic, chlorobenzoic, sulfobenzoic, theonic, nicotinic, naphthoic, and crotonic hydrazide.

(2) Dibasic acid dihydrazides such as oxalic, malonic, succinic, glutaric, adipic, pimelic, suberic, azelaic, sebacic, maleic, fumaric, citraconic, phthalic, isophthalic, terephthalic, and tartaric dihydrazide.

(3) Carbazates such as methyl, ethyl, propyl, isopropyl, t-butyl, sec.-butyl, isobutyl, n-butyl, hexyl, octyl, decyl, hexadecyl, octadecyl, benzyl, phenethyl, octenyl, allyl, cyclohexyl, cyclopentyl, phenyl, naphthyl, thenyl, furyl, and propynyl carbazate.

(4) Carbohydrazide.

The preferred t-butylhydrazinium salts are t-butylhydrazinium chloride (t-BZ.HCl) and di-t-butylhydrazinium sulfate [(t-BZ)$_2$.H$_2$SO$_4$].

The preferred carbonylhydrazines are 2-furoic acid hydrazide, acetylhydrazine, toluic acid hydrazide, succinic acid hydrazide, adipic acid dihydrazide carbohydrazide, t-butyl carbazate, and ethyl carbazate.

These compounds are solids which can be dissolved in water or alcohol to facilitate mixing into the resin or dispensing through pumping and metering equipment.

These compounds provide good quality foams over a wide density range and in a variety of resin types.

Generally, the amount of t-alkylhydrazinium salt or carbonylhydrazine can be varied over a relatively wide range to achieve the desired foam densities; however, they are typically used in amounts ranging from about 0.1 to about 10 phr and preferably from about 0.2 to about 5 phr. These compounds may be used alone or in combination with chemical/physical blowing agents.

Free Radical Sources

The process of the present invention employs, in conjunction with liquid resin, compounds which are capable of forming free radicals. These curing agents are typically peroxides and/or azos that decompose thermally at elevated temperatures.

Peroxides and azos which are useful in the present invention include:

(1) Dialkyl peroxides, such as dicumyl peroxide, di-t-butyl peroxide, 2,5-dimethyl-2,5-bis-(t-butyl-peroxy)hexane, 2,5-dimethyl-2,5-bis-(t-butylperoxy)hexyne-3, αα-di[(t-butylperoxy)-isopropyl]benzene, and t-butyl cumyl peroxide, (2) Peroxyketals, e.g., 1,1-di-(t-butylperoxy)-cyclohexane, 1,1-bis(t-butylperoxy) 3,3,5-trimethylcyclohexane, 2,2-bis(t-butylperoxy)butane, ethyl-3,3-di(t-butylperoxy)-butyrate, 1,1-di-(t-amylperoxy)cyclohexane, 2,2-di-t-amylperoxypropane, and n-butyl 4,4-bis(t-butylperoxy)valerate;

(3) Peroxyesters, e.g., t-butylperoxybenzoate, t-butyl peroxyacetate, t-butylperoxy-2-ethylhexanoate, 2,5-dimethyl-2,5-bis(2-ethylhexanoylperoxy)hexane, t-amyl peroxybenzoate, and t-amyl peroxyacetate;

(4) Monoperoxycarbonates, e.g., OO-t-butyl-O-isopropyl monoperoxycarbonate, OO-t-butyl-O-(2-ethylhexyl)monoperoxycarbonate, and OO-t-amyl-O-(2-ethylhexyl)monoperoxy carbonate;

(5) Diacyl peroxides, e.g., dibenzoyl peroxide, diisobutyryl peroxide, acelyl peroxide, 2,4-dichlorobenzoyl, and lauroyl peroxide;

(6) Ketone peroxides, e.g., methyl ethyl ketone peroxide, 2,4-pentanedione peroxide, and methyl isobutyl ketone peroxide;

(7) Hydroperoxides, e.g., t-butyl peroxide, t-amyl peroxide, cumene gydroperoxide, and 2,5-dimethyl-2,5-dihydroperoxyhexane;

(8) Peroxydicarbonates, e.g., di(n-propyl)peroxydicarbonate, di(sec-butyl)peroxydicarbonate, di(2-ethylhexyl)peroxydicarbonate, and di(2-phenoxyethyl)peroxydicarbonate; and (9) Aliphatic azos, e.g., symmetrical azos such as 2,2-azobis(2-acetoxypropane), 2,2-azobis(2-propionoxy-propane), 2-2-azo-bis(2-acetoxy-butane), 2,2-azo-bis-2-acetoxy-4-methylpentane), and 2,2-azo-bis(2-propionoxy-4-methylpentane), or unsymmetrical azos, such as o-2-t-butylaz-2-cyanobutane, 1-t-butylazo-1-cyanocyclohexane, 2-t-butylazo-2-methoxy-4-methylpentane, 1-t-amylazo-1-cyanocyclohexane, and 2-t-butylazo-2,4-dimethylpentane.

The generally preferred peroxides are the dialkyl peroxides such as, for example, dicumyl peroxide. These peroxides provide relatively long formulation shelf life at ambient temperature, give rapid foaming and curing at elevated temperature, and result in foams with excellent physical properties over a wide density range.

Mixtures of two or more peroxides and/or azos may also be used within the scope of this invention.

The amount of peroxides and/or azos used will depend upon the nature of the peroxides and/or azos, the curing temperature, the resin employed, the amount and type of t-alkylhydrazine salt and/or carbonylhyrazines. The amount of peroxide(s) and/or azo(s) can range from about 0.2 to about 20 parts per hundred parts of resin (phr) and preferably from about 0.5 to 10 phr. The ratio of peroxide to t-alkylhydrazinium salt and/or carbonylhydrazine is generally in the range of 1:1 to 10:1 and preferable 4:1 to 7:1 on a weight basis.

PROCESSING CONDITIONS

In general and broadly stated in the process of the present invention, the combination of a t-butylhydrazinium salt or a carbonylhydrazine with a peroxide in a free radically polymerizable medium generates gaseous decomposition products at elevated temperatures to provide foamed polymeric structure. The reaction produces free radicals simultaneously with gas generation which initiate polymerization to provide a crosslinked matrix. At the initial stage of reaction, the matrix is partially crosslinked, i.e., the matrix has fluidity characteristics such that the gases generated cause the matrix to expand. The gas bubbles dispersed through the gelled matrix, product either a "closed" or "open" cell configuration depending upon the amount and rate of evolution of the gas and the fluidity and strength characteristics of the resin medium during the period of gas generation. The major portion of the crosslinking reaction occurs after gas generation has ceased. This stage of reaction is accomplished by a significant increase in temperature. When the optimum concentration of reactants is employed, the resulting expanded and shaped resin is fully cured without the need for further post curing.

Thus, in the process of the present invention, the physical environmental conditions of temperature and pressure, the manipulative techniques and equipment employed in mixing components, and the shaping of the cellular structure during or after its production as well as after-treating by curing, and the like, may vary widely. Some such variables are discussed in greater detail below for illustrative purposes.

MIXING TECHNIQUES

Any conventional mixing method can be used to distribute the reactants throughout the resin medium. The order of addition of the reactants is not critical and may be varied for particular purposes. The t-alkylhydrazinium salt and/or carbonylhydrazines can be added and mixed separately into the resin medium; alternatively, the t-alkylhydrazinium salt and/or carbonylhydrazines and curing agent can be preblended and then mixed into the resin medium.

Several methods can be used to facilitate processing. The curing agent can be mixed with monomers such as styrene and the latter mixture added to the resin medium. The t-alkylhydrazine salt and/or carbonylhydrazines and curing agent can be blended into an emulsion, slurry, or extended with a suitable filler, such as $CaCO_3$. The curing agent and t-alkylhydrazinium salt and/or carbonylhydrazine can also be prepared as a foam concentrate or masterbatch in a carrier resin, such as polystyrene, polybutadiene, etc.

TEMPERATURE VARIATION

The temperature at which the t-alkylhydrazinium salt and/or carbonylhydrazine and curing agent are mixed with the resin should be low enough to avoid premature polymerization of the resin medium. In general, mixing should be performed at a temperature significantly below the 10 hour half-life temperature of the initiator. For example, in the case of dicumyl peroxide having a half-life of 10 hours at 115° C. one would maintain the temperature below 40° C. during mixing.

Operative temperatures depend upon the nature of the peroxide and/or azo curing agent and the resin. Generally, the reactive mixtures of the present invention will remain unreactive for several hours to several days at normal ambient temperatures (20°–35° C.). When it is desired to foam and cure the mixture the temperature is increased, for example, by placing in a mold heated sufficiently to cause the desired rate of reaction. Reaction, i.e., foaming and curing, can occur over a broad temperature range. The reaction temperature is generally at or slightly above the 10 hour half-life temperature of the peroxide being used. Thus, the foaming and curing reaction will occur between 100° F. and 400° F. (37° C. to 204° C.); the preferred curing temperature is generally between 150° F. and 350° F. (66° C. to 177° C.).

OPTIONAL ADDITIVES TO MEDIUM

The density of the foamed product structure can be controlled by the amount of reactants employed.

In some cases certain auxiliary chemical blowing agent and/or volatile compounds, which have boiling points such that the liquids vaporize during either the blowing or curing reaction, can also be used to enhance foaming. Representative examples of useful volatile compounds include water, n-heptane, cyclohexane, 1-heptene, and toluene. Representative examples of chemical blowing agents include azodicarbonamide, dinitrosopentamethylenetetramine, p-toluenesulfonylhydrazide, 4,4'-oxybis(benzenesulfonylhydrazide), and p-toluenesulfonylsemicarbazide. When such auxiliary chemical blowing agents and/or volatile compounds are used, they can be used in combinations with t-alkylhydrazinium salt and/or carbonylhydrazine in ratios of 1:5 to 5:1.

It has also been found useful to add surfactants to the resin medium to promote uniformity or cell size in the final product.

Such additives are particularly valuable in systems employing high concentrations of the blowing reactants. Such surfactants may be of the cationic (quaternary salts), anionic (sulfonates), and nonionic (ethylene oxide condensates) type. Some suitable surfactants include materials such as: Metallic soaps, alkylene oxidephenol products, alkyl aryl sulfates and sulfonates, dimethyl siloxane polymers, and cationic siloxanes of the general formula shown in U.S. Pat. No. 3,642,670 which are herein incorporated by reference. Air will also serve as a nucleating agent. Only a small amount, well dispersed as small bubbles throughout the resin, is needed (as distinguished from the case where one attempts to foam the resin by beating air into it). It is sufficient to mix the resin medium with the gas generating composition hereof (and other components hereof as desired) in the presence of air. In the experiments hereof carried out in paper cups and the like, this was accomplished simply by mixing with an electric stirrer. When one used molding equipment involving pumped stream(s) and a mixing head, one simply bleeds some air into the mixing head.

Hollow ceramic, glass, or graphite spheres can be added to the resin medium in order to decrease further the density of the final formed structure. These materials have densities less than that of the polymerized matrix and can be utilized to impact desired density or decorative properties to the foam.

Fillers are commonly used as components in any of the reactive medium described above following techniques well known to those skilled in the art of casting and molding resins at elevated temperatures. Fillers improve fabrication characteristics, reduce shrinkage, lower cost, and improve physical properties. A wide variety of fillers have been found to be compatible with the foaming process of this invention. Milled fiberglass and cotton flock are reenforcing fillers and tend to increase green strength, compressive strength and impact strength. Bulk fillers such as wood flours, clays, carbonates, and silicates decrease the cost and reduce thermo-expansion and shrinkage. Mineral fillers such as borax and alum are known to effectively reduce the burning rates. Examples of fillers include the following: pecan shell flour, milled fiberglass, wood chips, sawdust, vermiculite, carbon black, magnesium sulfate, cotton flock, calcium carbonate, mica steel wire, aluminum powder, polystyrene powder, polypropylene powder, polyethylene powder, polyvinylchloride powder, and powdered crosslinked butadieneacrylonitrile rubber.

EXAMPLES

The following examples are provided to illustrate preferred embodiments of the invention and are not intended to restrict the scope thereof. All parts are parts by weight and percentages are expressed as weight percentages unless indicated otherwise.

EXAMPLE 1

Foaming Polyester-Styrene Resin at Elevated Temperatures t-Alkylhydrazinium salts and carbonylhydrazines, (hereinafter called "compounds") were tested in a filled polyester resin formulation. To 67.5 g of Laminac 4123[1] was added 7.5 g of styrene monomer, 0.68 g (1 phr) of Dow Corning 193 surfactant, and 3.3 g of Luperox 500R[2]. After mixing thoroughly with a high speed electric mixer, the desired amount of the compounds (see table) was blended in with additional mixing. Finally, 8.0 g of Microthene "F"[3] and 67.0 g of alumina trihydrate[4] were added and mixed thoroughly. Room temperature pot life was determined from a 100 g portion of this mixture, which was poured into a capped 4-ounce glass jar. Also, the mixture was poured into a 20×150 mm test tube to a depth of 1.5 inches, and allowed to foam in a 121° C. (250° F.) constant temperature bath. The exotherm due to heat of reaction was recorded as a function of time. Cure time (time from 150° F. to peak temperature) was determined from the exotherm curve. After cooling, the test tube was broken and foam density was determined by water displacement. The results are as follows:

| Foaming Polyester Resin at 250° F. (121° C.) | | | | |
|---|---|---|---|---|
| Compounds (5) | % Compound in Diluent | Solution Added to Resin (g) | Cure Time (min) | Foam Density (lb/ft³) |
| None | — | — | 7.1 | 104 |
| t-BZ.HCl | 40% in H₂O | 1.10 | 6.2 | 30 |
| (t-BZ)₂.H₂SO₄ | 50% in H₂O | 1.32 | 5.8 | 38 |
| t.AZ.HCl | 40% in H₂O | 1.23 | 6.2 | 36 |
| Carbohydrazide | 25% in H₂O | 0.65 | 6.6 | 53 |
| Ethylcarbazate | 40% in H₂O | 0.71 | 6.5 | 52 |
| Acethydrazide | 40% in Methanol | 0.65 | 6.8 | 58 |

(1) Laminac 4123 in an orthophthalic acid-based resin produced by USS Chemicals. This resin contains approximately 30% sytrene monomer.
(2) Luperox 500R is a dialkyl peroxide, dicumyl peroxide, containing 5.9% active oxygen, available from Pennwalt Corp., Lucidol Division.
(3) Microthene "F" is a polyethylene powder produced by U.S. Industrial Chemicals Company.
(4) Alumina Trihydrate is produced by Alcoa (Aluminum Company of America).
(5) t-BZ = t-Butylhydrazine
t-AZ = t-Amylhydrazine This table shows that a wide variety of compounds have been found to be useful in preparing low density foams at elevated temperature. These results clearly show that the process of the present invention does not require the use of transition metals as taught by prior art. Unexpectedly the present invention results in significant reduction in cure time which is commercially valuable (reduced molding cycles, improved productivity).

EXAMPLE 2

Polyester Foams Using Various Curing Agents

A variety of curing agents were tested using the same procedure as described in Example 1, except that 1.1 g of a 40% aqueous solution of t-butylhydrazinium chloride was added as the compound in each case, and the amount of curing agent was blended as shown in the table. The results are as follows:

| Foaming Polyester Resin at 250° F. (121° C.) | | | |
|---|---|---|---|
| Curing Agent | Amount Added to Resin (g) | Cure Time (min) | Foam Density (lb/ft³) |
| Di-cumyl Peroxide | 3.3 | 6.2 | 31 |
| Di-t-butyl peroxide | 1.8 | 9.8 | 29 |
| t-butyl perbenzoate | 2.4 | 2.7 | 48 |
| 1,1-di-(t-butylperoxy)-cyclohexane | 2.0 | 3.8 | 41 |
| t-butyl cumyl peroxide | 2.8 | 7.2 | 34 |
| 2-t-butylazo-2-cyanopropane | 2.3 | 2.3 | 41 |

These results illustrate that a variety of peroxides and/or azos are useful curing agents in the process of this invention. Peresters, perketals, and aliphatic azos, as well as dialkyl peroxides, provide foams with uniform cell structure and good physical properties.

EXAMPLE 3

Polyester Foam Molded at Elevated Temperature 3-1. Polyester foams may be prepared by molding at elevated temperatures. To 116 g of Laminac 4123 resin[1] were added 13 g of styrene monomer, 7.7 g og Luperox 500R[2], 1.29 g of Dow Corning 193, and 0.76 g of hydroquinone[3]. After mixing thoroughly on a high speed electric mixer, 0.82 g of t-butylhydrazinium chloride was added and mixed thoroughly. To this mixture, 15 g of Microthene "F"[4] was blended; following which, 224 g of alumina trihydrate[5] was added and mixed. One ply of 1.5 oz continuous strand mat[6] was placed into a chrome plated steel mold which had been preheated to 300° F. After rapidly pouring in 200 g of the mixture, the mold was closed pneumatically to a predetermined position to give a molded foam of 0.17 inch thickness. After two minutes the mold was opened and the rigid foam panel (8.25 inches×8.25 inches×0.17 inches) was removed. The foamed panel had a density of 88 lbs/ft³.

3-2. In contrast, a non-foamed rigid polyester panel was molded at elevated temperatures. To 116 g of Laminac 4123 were added 7.7 g of Luperox 500R, 13 g of styrene monomer, 1.29 g of Dow corning 193 surfactant, and 0.76 g of hydroquinone. After mixing thoroughly, 15 g of Microthene "F" were blended; following which, 224 g of alumina trihydrate were added and mixed. Two ply of 1.5 oz continuous strand mat was placed into a chrome plated steel mold which had been preheated to 300° F. After rapidly pouring in 300 g of the mixture into the mold, the mold was closed pneumatically to a mold pressure of 600 psi. After five minutes the mold was opened and the rigid panel (8.25 inches×8.25 inches×0.19 inches) was removed. The panel had a density of 118 lbs/ft³.

[1]Laminac 4123 is an orthophthalic acid-based resin marketed by U.S.S. Chemicals. This resin contains approximately 30% styrene monomer.
[2]Luperox 500R is a dialkyl peroxide, dicumyl peroxide, containing 5.9% active oxygen, available from Pennwalt Corp.
[3]Hydroquinone is an inhibitor marketed by Eastman Chemical Products, Inc.
[4]Microthene "F" is a polyethylene powder marketed by U.S. Chemicals Company.
[5]Alumina Trihydrate is marketed by Alcoa (Aluminum Company of America).
[6]Available from Owens-Corning Fiberglass.

EXAMPLE 4

Foaming of Thickened Polyester Resin Formulation 4-1. Molded rigid foams were prepared at elevated temperatures from a thickened polyester resin formulation. To 308 g of Laminac 4123 polyester resin were added 34.4 g of styrene, 16.8 g of Luperox 500R, 3.2 g of Dow corning 193 surfactant, and 3.2 g of hydroquinone. After mixing thoroughly with a high speed electric mixer, 1.8 g of t-butylhydrazinium chloride were added and mixed thoroughly; following which, 40 g of Microthene "F" were added and mixed. This mixture was poured into a Ross intensive mixer and blended with 8.0 g of Marinco H (technical grade magnesium hydroxide, from Merck & Co.) and 302.4 g of alumina trihydrate. After mixing for 10 minutes, 80 g of ¼" chopped fiberglass were added and mixed for an additional 20 minutes.

After allowing the formulation to thicken for five days, 230 g of the mixture were placed in a chrome plated steel mold which had been preheated to 300° F. (149° C.). The mold was closed pneumatically to a predetermined position to give a molded foam of 0.17 inches thickness. After 2 minutes, the mold was opened and the rigid foam panel (8.25 inches×8.25 inches×0.17 inches) was removed. The foamed panel had a density of 96 lbs/ft$^3$.

4-2. In contrast, a non-foamed rigid panel was prepared at elevated temperature from a thickened polyester resin formulation. To 308 g of Laminac 4123 were added 34 g of styrene monomer, 16.2 g of Luperox 500R, 3.4 g of Dow corning 193 surfactant, and 1.6 g of hydroquinone. After mixing thoroughly with a high speed electric mixer, 39 g of Microthene "F" were added and mixed. This mixture was poured into a Ross intensive mixer and blended with 8.6 g of Marinco H and 294 g of alumina trihydrate. After mixing for 10 minutes, 79 g of ¼" chopped fiberglass were added and mixed for an additional 20 minutes.

After allowing the formulation to thicken for five days, 350 g of the mixture were placed in a chrome plated steel mold which had been preheated to 300° F. (149° C.). The mold was closed pneumatically to a mold pressure of 600 psi. After 5 minutes the mold was opened and the rigid panel (8.25 inches×8.25 inches×0.17 inches) was removed. The panel had a density of 119 lbs/ft$^3$.

This example illustrates that rigid polyester forms can be prepared using molding techniques commonly used with thickened polyester resin formulations such as, for example, sheet molding compound (SMC) or bulk molding compound (BMC).

EXAMPLE 5

Rigid foams were prepared from other polymerizable media using the same technique as described in Example 1. The following components were blended into the test mixtures and reacted at 300° F. (149° C.):

| Grams | Component |
|---|---|
| 0.68 | Dow Corning 193 Surfactant |
| 0.35 | t-butylhydrazinium chloride |
| 8.0 | Microthene |
| 67.0 | Alumina Trihydrate |

The results of various test mixtures were recorded in the following table:

| Test Mixture | A | B | C | D | E | F |
|---|---|---|---|---|---|---|
| Component (g) | | | | | | |
| Resin | 67.5 | 75.0 | 40.5 | 40.5 | 75.0 | 75.0 |
| Styrene | 7.5 | — | 4.5 | 4.5 | — | — |
| Additive | — | — | 30.0 | 30.0 | — | — |
| Curing Agent | 2.8 | 3.3 | 2.1 | 2.0 | 2.3 | 2.4 |
| Density (lbs/ft$^3$) | | | | | | |
| Foamed | 64 | 44 | 56 | 45 | 47 | 47 |
| Non-Foamed | 109 | 105 | 104 | 104 | 110 | 107 |

Mixture A: Resin is MR 13031, an isophthalic acid-based molding resin marketed by U.S.S. Chemicals. The curing agent is Lupersol 801, t-butyl cumyl peroxide, available from Pennwalt Corp.
Mixture B: Resin is E-4297-5, a one-component low profile, isophthalic acid-based molding resin marketed by Owens Corning Fiberglass. The curing agent is Luperox 500R, dicumyl peroxide, available from Pennwalt Corp.
Mixture C: Resin is Laminac 4123, an orthophthalic acid-based resin marketed by U.S.S. Chemicals. Additive is Uralloy Hybrid polymer containing 60% styrene. Uralloy Hybrid polymer is a low profile additive marketed by Olin Chemicals. The curing agentis Lupersol 231, 1,1-bis(t-butylperoxy)-3,3,5-trimethylcyclohexane, available from Pennwalt Corp.
Mixture D: Resin is Laminac 4123, an orthophthalic acid-based resin marketed by U.S.S. Chemicals. Additive is P-701, a low profile additive marketed by Owens Corning Fiberglass. The curing agent is Lupersol 331-80B,1,1-di(t-butylperoxy)cyclohexane available from Pennwalt Corp.
Mixture E: Resin is Derakane 790, a vinyl ester resin marketed by Dow Chemical Co. The curing agent is 2-t-butylazo-2-cyanopropane, an unsymmetrical aliphatic azo.
Mixture F: Resin is Herrom 197-3, a chlorendic anhydride based fire retardant resin marketed by Ashland Chemicals. The curing agent is t-butylperbenzoate, available from Pennwalt Corp.

This table shows that polymeric foams can be obtained from a variety of polymerizable media using a variety of curing agents. The curing agent is Luperox 500R, dicumyl peroxide, available from Pennwalt Corp.

EXAMPLE 6

Rigid polyester foams were prepared using the same polyester resin and the same technique described in Example 1, where 1.1 g of t-butylhydrazinium chloride was added and 3.3 g of Luperox 500R was blended in each case. Data given below indicated that polymeric foams may readily be prepared over a broad temperature range.

| Mold Temperature (°F.) | 250 | 300 | 350 |
|---|---|---|---|
| Density (lbs/ft$^3$) | 64.5 | 38.2 | 37.6 |

EXAMPLE 7

A number of unsaturated polyester foams were prepared using the same resin and the same technique as described in Example 1, except the amount of t-butylhydrazinum chloride and the amount of curing agent, Luperox 500R, were blended as shown in the following table. The results are as follows:

| Foaming Polyester Resin at 300° F. (149° C.) | | | | | | | |
|---|---|---|---|---|---|---|---|
| Ratio of Curing Agent to t-BZ.HCl | 12:1 | 9:1 | 9:1 | 9:1 | 6:1 | 6:1 | 6:1 |
| Amount of Luperox 500 R (g) | 4.4 | 3.3 | 2.4 | 1.5 | 2.2 | 1.6 | 1.0 |
| Amount of t-BZ.HCl (g) | 0.35 | 0.35 | 0.26 | 0.16 | 0.35 | 0.26 | 0.16 |
| Density (lbs/ft$^2$) | 41.5 | 38.8 | 41.0 | 42.2 | 38.2 | 45.8 | 38.8 |

These results illustrate that a range of densities are obtainable by varying the amounts of curing agent and/or compound.

EXAMPLE 8

Blends of t-butylhydrazinium chloride with auxiliary chemical blowing agents were tested in a filled polyester resin formulation. To 68.0 g of Laminac 4123 was added 8.0 g of styrene monomer, 0.8 g of Dow Corning 193 surfactant, and 3.3 g of Luperox 500R. After mixing thoroughly with a high speed mixer, the desired amount of compounds, as shown in the following table, were blended in with additional mixing. Finally, 8.0 g of Microthene "F" and 67.0 g of alumina trihydrate were added and mixed thoroughly. Cure times and foam densities were determined using the same procedure described in Example 1. The results are as follows:

| Foaming Polyester Resin Using Auxiliary Chemical Blowing Agents | | | | |
|---|---|---|---|---|
| Bath Temp. (°C.) | 121 | | 177 | |
| Compounds | 1 | 2 | 1 | 2 |
| t-BZ-HCl[1] | — | 0.45 | — | 0.45 |
| DNPT[2] | 0.9 | 0.45 | — | — |
| ADA[3] | — | — | 0.35 | 0.18 |
| Cure Time (min.) | 7.0 | 6.7 | 4.4 | 4.1 |
| Density (lbs./ft$^3$) | 45.8 | 33.6 | 29.4 | 20.7 |

[1]t-BZ.HCl — 40% aqueous solution of t-butylhydrazinium chloride
[2]DNPT — dinitrosopentamethylenetetramine, 80% in inert filler
[3]ADA — azodicarbonamide This example illustrates that blends of t-butylhydrazinium chloride with auxiliary chemical blowing agents will provide low density rigid polymeric foams at elevated temperatures.

EXAMPLE 9

This example illustrates that polyester foams may be prepared by molding at elevated temperatures using blends of t-butylhydrazinium chloride with auxiliary chemical blowing agents. To 68.0 g of Laminac 4123 resin were added 7.0 g of styrene monomer, 3.3 g of Luperox 500R, and 0.8 g of Dow Corning 193 surfactant. After mixing thoroughly on a high speed electric mixer, 0.35 g of t-butylhydrazinium chloride and 0.35 g of azodicarbonamide was added and mixed thoroughly. To this mixture, 8.0 g of Microthene "F" was blended; following which, 67.0 g of alumina trihydrate was added and mixed. One ply of 1.5 oz. continuous strand mat was placed into a chrome plated steel mold which had been preheated to 250° F. (121° C.). After rapidly pouring in 130 g of the mixture, the mold was closed pneumatically to a predetermined position to give a molded foam of 0.17 inch thickness. After two minutes the mold was opened and the rigid foam panel (8.25 inches×8.25 inches×0.17 inches) was removed. The foamed panel had a density of 57.2 lbs./ft$^3$. In contrast, as described in Example 3-2, a non-foamed rigid polyester panel molded at elevated temperature had a density of 118 lbs./ft$^3$.

What is claimed:

1. A foamable and crosslinkable composition consisting essentially of an admixture of
    (a) an unsaturated polyester resin including an unsaturated monomer,
    (b) a free radical initiator selected from the group of dialkyl peroxides, peroxyketals, peroxyesters, monoperoxycarbonates, and aliphatic azos and which initiator is activated at temperatures from about 100° to about 400° F., and
    (c) a compound selected from a t-alkylhydrazinium salt, a carbonylhydrazine or a mixture thereof.

2. The composition of claim 1 wherein the compound is selected from t-butylhydrazinium chloride, di-t-butylhydrazinium sulfate, t-amylhydrazinium chloride, carbohydrazide, ethylcarbazate, and acetylhydrazide.

3. The composition of claim 2 wherein the free radical initiator is selected from di-cumyl peroxide, di-t-butyl peroxide, t-butyl perbenzoate, 1,1-di-(t-butylperoxy)cyclohexane, t-butyl cumyl peroxide, 2-t-butylazo-2-cyanopropane, and 1,1-di(t-butylperoxy)-3,3,5-trimethylcyclohexane.

4. The composition of claim 3 wherein the unsaturated polyester resin is an orthophthalic acid resin and styene.

5. The composition of claim 3 wherein the unsaturated polyester resin is a vinyl ester resin and styrene.

6. The composition of claim 3 wherein the concentration of the unsaturated polyester resin is 100 parts, the free radical initiator is from about 0.2 to about 20 parts, and the compound is from about 0.1 to about 10 parts.

7. The composition of claim 6 wherein a suitable surfactant is present in the composition.

8. The composition of claim 6 wherein a filler is present in the composition.

9. A method for preparing a foamed and crosslinked resin comprising reacting the composition of claim 1 in a temperature range of from about 100° to about 400° F. until foaming and crosslinking have been effected.

10. The method of claim 9 wherein a suitable surfactant and filler are added to the reaction mixture after the compound has been thoroughly mixed into the reaction mixture.

11. The composition of claim 1 wherein an auxiliary blowing agent is present in the composition.

12. The composition of claim 11 wherein the auxiliary blowing agent is selected from azodicarbonamide and dinitrosopentamethylenetetramine.

* * * * *